United States Patent [19]

King

[11] 4,209,346
[45] Jun. 24, 1980

[54] SOLAR ENERGY RECHARGER

[76] Inventor: Roger A. King, 5820 Colfax Ave., South, Minneapolis, Minn. 55419

[21] Appl. No.: 10,415

[22] Filed: Feb. 8, 1979

[51] Int. Cl.² .................. H01L 31/04; H01M 10/44
[52] U.S. Cl. ..................... 136/89 PC; 136/89 EP; 136/89 AC; 320/2; 320/48
[58] Field of Search ........... 136/89 P, 89 PC, 89 EP, 136/89 AC; 320/2

[56] References Cited

U.S. PATENT DOCUMENTS

| | | | |
|---|---|---|---|
| 3,268,366 | 8/1966 | Guyot | 136/89 |
| 3,819,417 | 6/1974 | Haynos | 136/89 |
| 3,957,537 | 5/1976 | Baskett et al. | 136/89 |
| 4,009,051 | 2/1977 | Kazis et al. | 320/15 |
| 4,122,396 | 10/1978 | Grazier et al. | 325/492 |

FOREIGN PATENT DOCUMENTS 1013719  8/1957  Fed. Rep. of Germany ............ 136/89
1223571  6/1960  France .................................... 136/89

OTHER PUBLICATIONS

"Solar Energy Climbs Everest," *Electronics & Power,* Oct. 9, 1975, p. 950.

*Primary Examiner*—Aaron Weisstuch
*Attorney, Agent, or Firm*—Merchant, Gould, Smith, Edell, Welter & Schmidt

[57] ABSTRACT

A portable power supply including a rechargeable battery, an array of solar cells, a heat sink thermally engaging the cells and the batteries for transmission from the former to the latter, and a cover pivotal between a first position in which it protects the solar cells and a second position in which it supports the unit with the cells in optimum orientation for insulation.

9 Claims, 10 Drawing Figures

U.S. Patent Jun. 24, 1980 Sheet 1 of 3 4,209,346
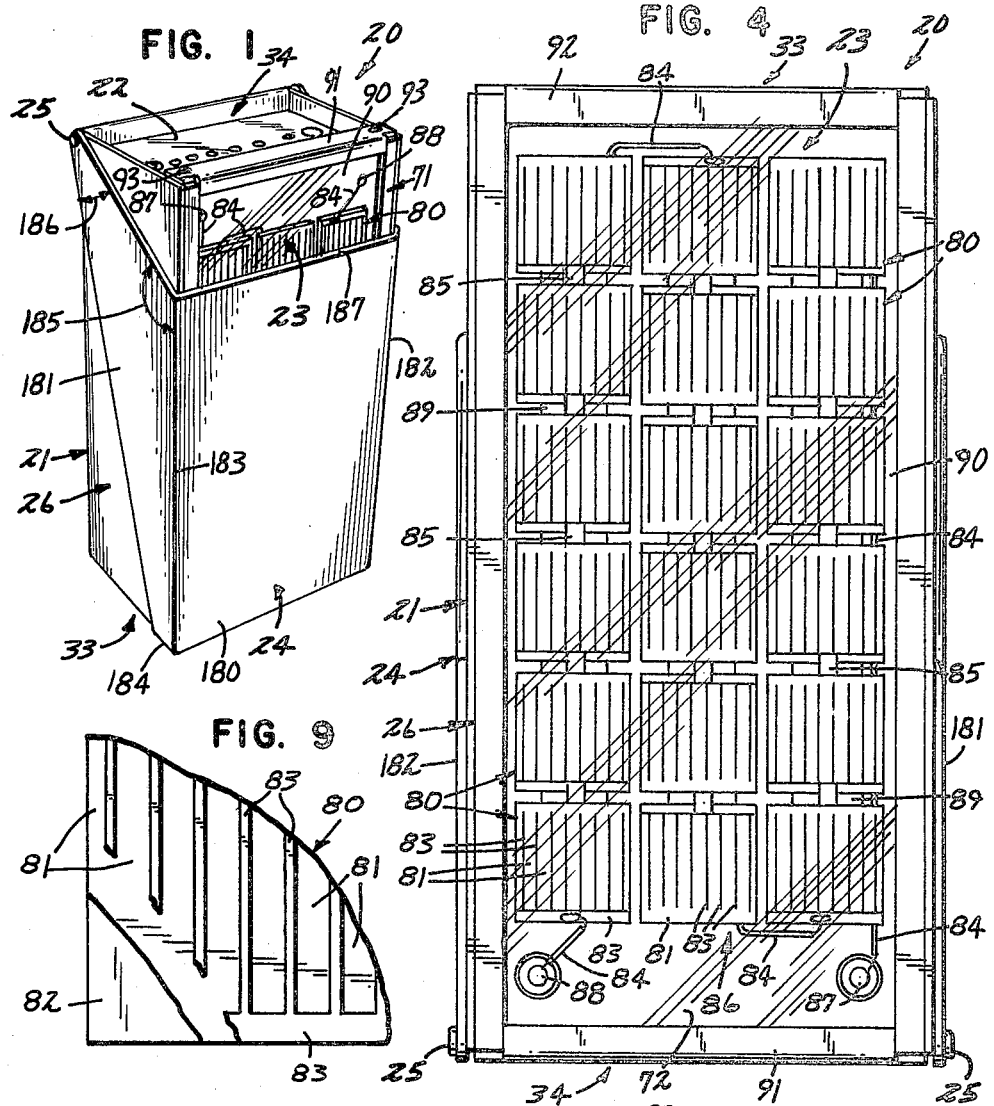
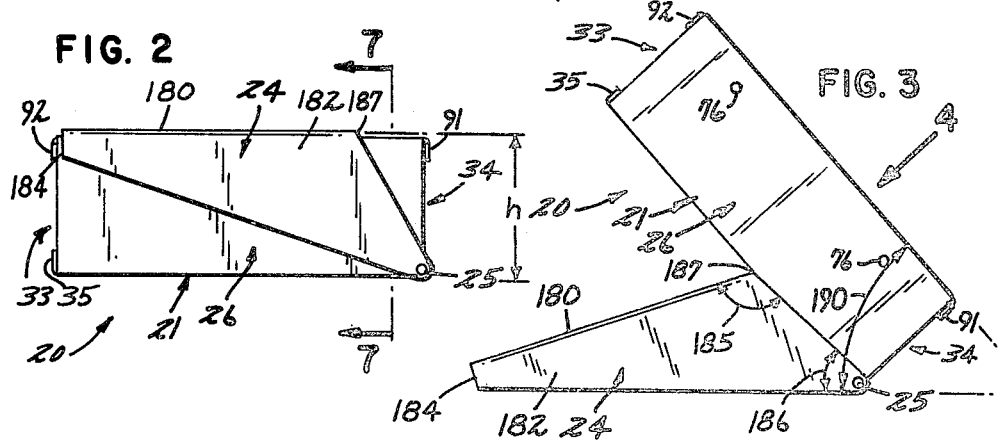

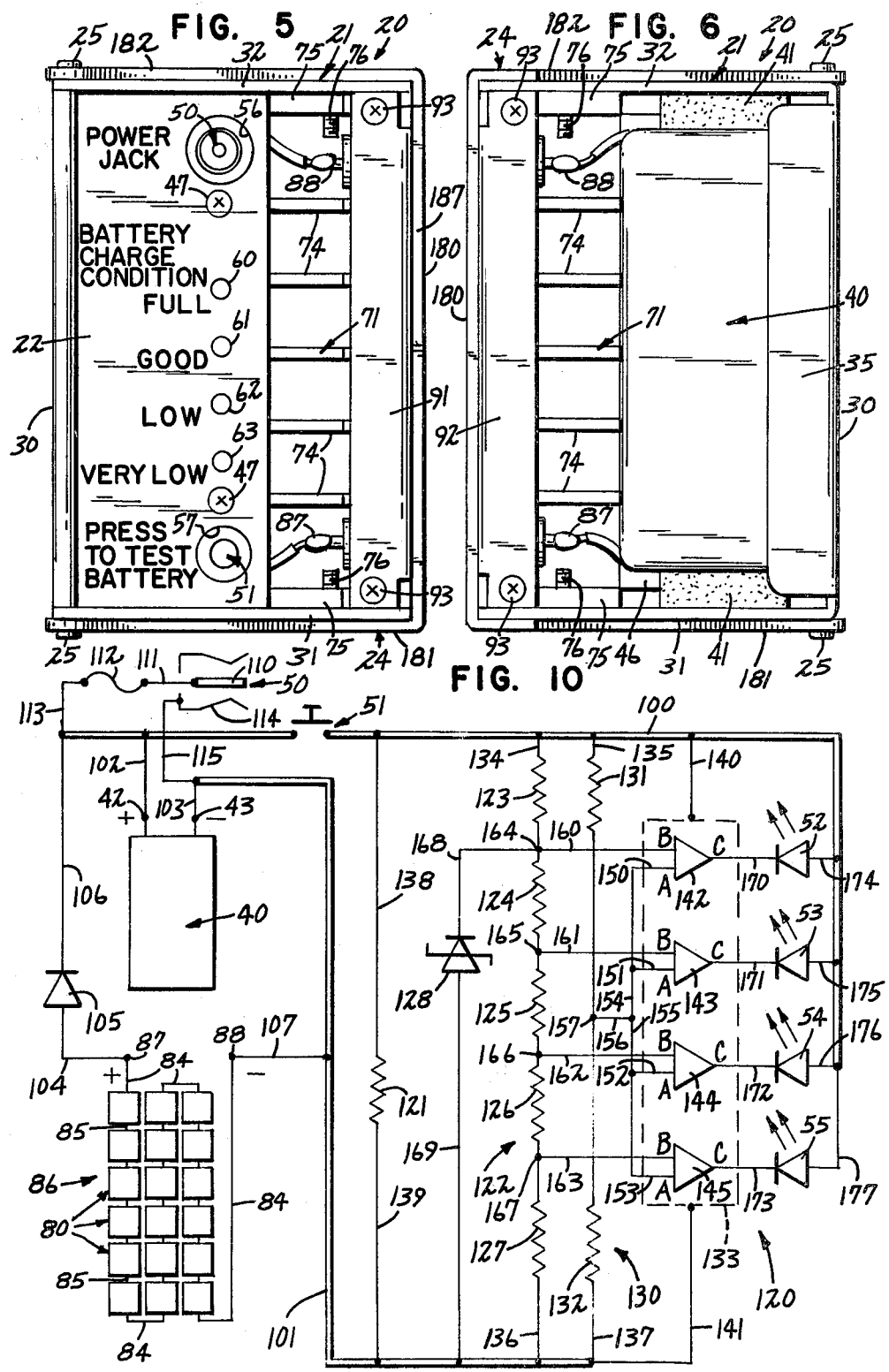

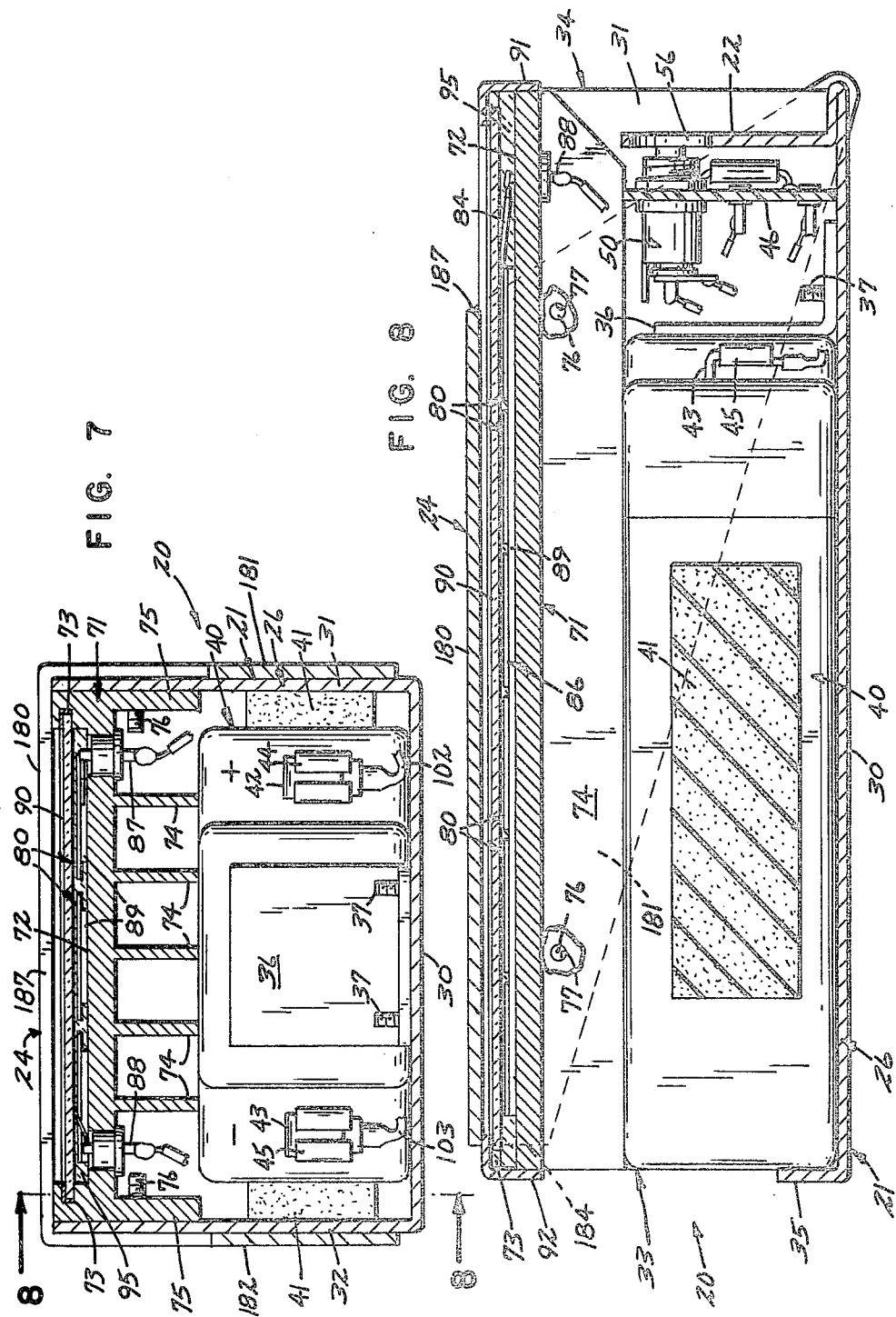

SOLAR ENERGY RECHARGER

This invention relates to the general field of electronics, and specifically comprises an improved portable power supply.

BACKGROUND OF THE INVENTION

There are numerous areas of the world where electrical energy is not distributed and available to the public. In these areas electronic equipment such as radio receivers, tape recorders and players, computers, and even small light sources must operate from local power supplies, usually batteries. Primary batteries are common, but must be discarded when exhausted. Secondary batteries are also known, and can be recharged after use if a suitale source is available to which they can be connected: the efficiency of such batteries decreases as their temperature falls. It is also known that solar cells may be connected to supply charging energy for suitable secondary batteries when the cells are positioned for impingement by sunlight: the efficiency of such cells decreases as their temperature rises.

SUMMARY OF THE INVENTION

The present invention comprises a portable power source having a secondary battery arranged for recharging from a battery or panel of appropriately interconnected solar cells exposed to solar energy, the source being especially designed for increased efficiency first by including means enabling the solar panel to positioned in an optimum manner with respect to the sun, and second by providing means, including a finned heat sink, whereby the heat absorbed by the solar panel is conducted to the battery, increasing the operational efficiency of both the solar cells and the battery.

Other advantages and features of novelty which characterize the invention are pointed out with particularlity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 1 is a perspective view of a portable power source according to the invention, in its closed or transport condition;

FIG. 2 is a side view of the structure of FIG. 1, to a smaller scale;

FIG. 3 is a side view of the same structure in its open or charging position, to the same scale;

FIG. 4 is a view to a larger scale of the structure of FIG. 3, viewed in the direction of the arrow 4 on that figure;

FIG. 5 is an end view of the structure of FIG. 1 as seen from above;

FIG. 6 is a view of the structure from the opposite end;

FIG. 7 is a sectional view taken along the line 7—7 of FIG. 2, but to a larger scale;

FIG. 8 is a sectional view taken generally along the line 8—8 of FIG. 7;

FIG. 9 is a fragmentary schematic detail of a solar cell as used in the invention; and FIG. 10 is a circuit diagram of this embodiment of the invention.

DESCRIPTION OF THE PREFERRED EMBODIMENT

As shown in the drawing, power source 20 comprises a housing 21 having a control panel 22 and supporting a solar panel 23: a cover member 24 pivotally coacts with housing 21 at a pair of pivot screws 25, 25.

Housing 21 comprises a channel 26 of sheet metal having a bottom 30, side walls 31 and 32, and open ends 33 and 34. At end 33 bottom 30 is turned up to provide a stop tab 35, and a bracket 36 is secured to bottom 30 by fasteners 37. A rechargeable battery 40 is gripped between tab 35 and bracket 36, and is secured between walls 31 and 32 by resilient pads 41. Electrical connection is made to positive terminal 42 and negative terminal 43 of battery 40 by spring connectors 44 and 45, respectively.

At end 34, bottom 30 is retroverted to form control panel 22, behind which a sub-panel 46 of electrically nonconductive material is mounted by fasteners 47. Mounted on sub-panel 46 are a power jack 50, a single-pole single-throw normally open battery test switch 51, a plurality of indicator lights 52, 53, 54, 55 (see FIG. 10) in the form of light emitting diodes, and circuit components such as resistors, diodes, and an integrated circuit identified more fully in connection with FIG. 10. Apertures 56 and 57 are provided in panel 22 to give access to jack 50 and switch 51, and further apertures 60-63 are provided through which the indicator lights can be observed.

Channel 26 is closed for its full length by solar panel 23, of which the principal component is a heat sink 71 of metal having a flat surface 72, a pair of grooves 73 spaced from surface 72, and a plurality of fins 74, 75 extending away from surface 72. Sink 71 is secured to the inner surfaces of walls 31, 32 by fasteners 76 engaging tapped holes 77 in the outer fins 75, which are thicker than the remaining fins 74.

Secured to surface 72 are a plurality of solar cells 80. Each cell 80 is shown in FIG. 9 to comprise a body 81 of photovoltaic material, upon the rear surface of which is deposited a conductive layer 82 which may be continuous, and which acts as one electrode of the solar cell. Upon the front surface of each body is deposited a branched conductor pattern 83 which acts as the other electrode of the solar cell, and yet does not occlude a significant area of the body from impingement by solar energy. Cells 80 are electrically interconnected in series by suitable conducting wires 84 or ribbons 85, to form a solar battery 86 having positive and negative terminals 87 and 88, respectively, in the form of feed-through insulators mounted in sink 71.

Cells 80 are secured to surface 72 in heat transfer relation, but not in electrically conducting relation. This is accomplished by the use of strips 89 of double faced tape which are electrically nonconductive and yet are sufficiently thin that heat transfer therethrough is readily accomplished. A protective cover plate 90 of material transparent to solar radiation is received in grooves 73, and end clamps 91 and 92 are secured to the ends of sink 71 by fasteners 93. After the cells, cover plate, and one end clamp are secured, a suitable electrically nonconductive encapsulating compound 95 is introduced in liquid form into the space between plate 90 and surface 72 and allowed to set into a clear rigid body which supports, insulates and protects cells 80 and mounting tapes 89. When the other end clamp is secured in place, the solar panel or battery is completed.

FIG. 10 is a circuit diagram presented simply as exemplary of numerous circuits which may be used in a power source of this sort. It will appreciated that circuits of greater or lesser complexity can be used according to the wishes of the designer. In FIG. 10 a power bus 100 and a negative bus 101 are shown. Positive terminal 42 of battery 40 is connected to bus 100 by conductor 102, and negative terminal 43 of battery 40 is connected to bus 101 by conductor 103. Positive terminal 87 of solar battery 86 is connected by conductor 104 to the anode of a diode 105, the cathode of which is connected by conductor 106 to bus 100. Negative terminal 88 of solar battery 86 is connected to bus 101 by conductor 107. Power jack 50 has a central contact 110 connected through conductor 111, an overload device 112, and conductor 113 to positive bus 100, and has a shell contact 114 connected through conductor 115 to negative bus 101.

Positive bus 100 is continued through switch 51 to a control circuit 120 including a load resistor 121, a first voltage divider chain 122 including resistors 123, 124, 125, 126 and 127 in series, a Zener diode 128, a second voltage divider chain 130 including resistors 131 and 132 in series, an integrated circuit 133, and light emitting diodes 52, 53, 54, 55. Chains 122 and 130 are connected to bus 100 by conductors 134 and 135, and to bus 101 by conductors 136 and 137, all respectively. Resistor 121 is connector to positive bus 100 and negative bus 101 by conductors 138 and 139.

Integrated circuit 133 is connected to bus 100 and bus 101 by conductors 140 and 141, for power. It comprises a plurality of operational amplifiers 142, 143, 144, and 145 connected as voltage comparators. First input terminals A of these comparators are all connected, by conductors 150, 151, 152, 153, 154, 155 and 156, to the junction point 157 between resistors 131 and 132 in voltage divider chain 130. Second input terminals B of the comparators are severally connected, by conductors 160, 161, 162, and 163, to successive junction points 164, 165, 166 and 167 of voltage divider chain 122. Zener diode 128 is connected to junction point 164 on voltage divider chain 122 by conductor 168, and to negative bus 101 by conductor 169. The output terminals C of the comparators are connected by conductors 170, 171, 172 and 173 to the cathodes of diodes 52, 53, 54 and 55: the anodes of these diodes are connected to positive bus 100 by conductors 174, 175, 176 and 177.

Before considering the operation of the invention electrically and optically, reference should again be had to FIGS. 1-3. Cover 24 is shown to comprise a first, generally rectangular panel 180 and a pair of further, generally flat panels 181 and 182 perpendicular thereto and spaced mutually by the width of housing 21. Each further panel has the outline of an obtuse scalene triangle having a base 183 at its intersection with the first panel, a first base angle truncated at 184, a second base angle 185 greater than 90°, and an apex angle 186 whose altitude h above base 183 is substantially the thickness of housing 21. Fasteners 25 normally secure cover 24 to housing 21 for pivotal movement between a first position shown in FIG. 2 and a second position shown in FIG. 3. In the first position panel 180 substantially overlies solar panel 23 to give it mechanical protection during transportation and general use. An instruction plate may be secured to panel 180 to lie against the solar cell panel in this position of the cover. In the second position the back 30 of housing 21 engages one edge 187 of panel 180 to support the solar panel at an angle to the horizontal, so that solar energy may fall more nearly perpendicularly on the panel during the period of the day when available solar energy is greatest. This gives optimum radiant flux density and thus optimum efficiency of charging. The solar altitude varies from sunset to sunrise, and its maximum value varies and latitude on the earth's surface: in the unit shown in the drawings, angle 186 has been chosen so that in FIG. 3 the solar panel makes an angle 190 of 45° with the horizontal, but other angles in the range between 30° and 60° are possible.

In one embodiment of the invention, the following components were found satisfactory:

| Diode 105      | IN 4004     |
|----------------|-------------|
| Zener diode 128| IN 4728A    |
| Diodes 52–55   | MIL 317     |
| Resistors 121, 123 | 32 ohms |
| Resistors 124–126 | 1,000 ohms |
| Resistor 127   | 10,000 ohms |
| Resistor 131   | 3,300 ohms  |
| Resistor 132   | 5,100 ohms  |

OPERATION

In the condition of the power supply shown in FIGS. 1 and 2 the apparatus is entirely quiescent. Control circuit 120 is disconnected from batteries 40 and 86 at switch 51, no energy is being drawn at jack 50, no significant insolation of the solar panel is taking place so that its terminals are at a lower voltage than those of battery 40, and current flow from battery 40 to battery 86 is prevented by diode 105. To use the power supply, it is positioned near a device to be energized, and a plug wired to that device is inserted into jack 50, proper polarity being observed. Current now flows from positive terminal 42 of the battery through conductors 102 and 113, protective device 112, conductor 111, and the center contact 110 of the jack 50 to the device, returning through the shell contact 114 of the jack 50 and conductors 115 and 103 to negative terminal 43 of the battery 40.

It is not desirable to use battery 40 until it is entirely discharged, as with at least some secondary batteries complete discharge produces changes in the electrolyte which prevent subsequent recharging from solar cells as a source. Accordingly, at suitable intervals, or if the device being energized seems to indicate low energization, the condition of charge of battery 40 is investigated by momentarily closing switch 51. This extends positive bus 100 to control circuit 120, energizing voltage divider chains 122 and 130 and integrated circuit 133, and connecting resistor 121 as a load on battery 40. The resistance of resistor 121 is quite low, and produces sufficient drain on the battery to cause a singificant drop across the internal resistance of the latter. If the battery is fully charged, its internal resistance is minimum, and the voltage drop across load resistor 121 is accordingly maximum. As the charge in the battery decreases its internal resistance increases, and the voltage drop across resistor 121 decreases. The voltage at junction point 157, and therefore on the first terminals of the voltage comparators, varies with that between bus 100 and bus 101. On the other hand, the voltage at junction point 164, and hence, at junction points 165, 166 and 167, is maintained constant by Zener diode 128, so that the second terminals of the voltage comparators remain at predetermined voltages. As long as its first terminal is at a higher voltage than its second terminal, each voltage comparator provides a conductive path for its associated indicating diodes from bus 100 to bus 101: if the input voltage relation reverses the conductive path is cut off. The values of resistors 123-127, 131 and 132 are so chosen that for a fully charged battery the voltage at junction point 157 is greater than that maintained at junction point 164, while as the charge in battery 40 decreases the voltage on junction point 157 becomes successively less than those at junction points 164, 165, 166 and 167, the latter just occurring when battery 40 is very low but has not yet fallen below the level at which recharging can be accomplished.

It is evident therefore, that when switch 51 is closed, all of diodes 52-55 emit light if the battery is fully charged. As the state of charge of the battery decreases, the voltage at junction point 157 becomes less and less, and diodes 52, 53, 54 and 55 successively fail to light. This gives clear indication to the user of the state of battery 40. Upon releasing switch 51, the control circuit is deenergized and causes no further drain on battery 41.

When there is an indication of incomplete charge, cover 24 is moved into the relation with housing 21 shown in FIG. 3, and the unit is positioned so that sunlight falls directly on solar panel 23. The voltage of cell 80 in series is then greater than the battery voltage, and charging current flows through diode 105. If heavy clouds intervene or for some other reason the irradiation of panel 23 decreases until the output of the solar battery is less than that of battery 40, the latter is protected, against discharge through the solar cells, by diode 105.

It is clear that charging of battery 40 can take place at the same time that the unit is supplying energy to a utilization device, the effective charging rate being less than maximum by the power drain.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. A solar panel including a plurality of solar cells mounted on the surface of a heat sink having heat conductive fins, a rechargeable battery, and means including a housing for mounting said panel and said battery so that heat is transferred between said sink and said battery.

2. A structure according to claim 1 in which said fins engage a surface of said battery.

3. A structure according to claim 1 including means electrically connecting said panel in charging relation to said battery, means for taking an electrical output from said battery, and means operable to indicate the condition of charge of the battery.

4. A power source including a housing, a generally flat solar cell panel mounted to comprise one face of said housing, and cover means pivotally mounted on said housing for movement between a first position, in which it substantially overlies said panel, and a second position, in which it supports said housing with said panel at a predetermined angle with respect to the horizontal.

5. A power source according to claim 4 in which said cover member comprises a first generally flat panel and further generally flat panels perpendicular thereto, said further panels being mutually spaced by a distance equal to one dimension of said solar cell panel and having the outlines of similar truncated obtuse triangles having bases intersecting said first flat panel, first base angles greater than 90°, second base angles, and apex angles spaced from said first flat panel by substantially the dimension of said housing perpendicular to said solar cell panel.

6. A power source according to claim 5 in which said cover means is pivoted at said apex angles to opposite corners of said housing remote from said solar cell panel.

7. A power source according to claim 5 in which said apex angle is such that when said cover means is pivoted into said second position, said solar cell panel makes an angle of about 45° with the horizontal.

8. A power source according to claim 5 in which said apex angle is such that when said cover means is pivoted into said second position said solar cell panel makes an angle of between 30° and 60° with the horizontal.

9. A power source according to claim 4 including an instruction plate secured to said cover means so as to lie against said solar cell panel in said first position of said cover means.

* * * * *